United States Patent [19]

Cikanek, Jr. et al.

[11] Patent Number: 5,323,753

[45] Date of Patent: Jun. 28, 1994

[54] INDUCTION SYSTEM FOR AN INTERNAL COMBUSTION ENGINE

[75] Inventors: Harry A. Cikanek, Jr., Northville; George C. Davis, Ypsilanti, both of Mich.

[73] Assignee: Ford Motor Company, Dearborn, Mich.

[21] Appl. No.: 942,909

[22] Filed: Oct. 19, 1992

[51] Int. Cl.⁵ .................................. F02M 29/04
[52] U.S. Cl. ................... 123/593; 123/337; 48/189.6
[58] Field of Search ............... 123/432, 590, 593, 308, 123/336, 337; 48/189.6

[56] References Cited

U.S. PATENT DOCUMENTS

| | | | |
|---|---|---|---|
| 2,035,538 | 3/1936 | Dean et al. | 48/189.6 |
| 2,246,876 | 6/1941 | Carver | 123/590 |
| 2,684,059 | 7/1954 | Schneider | 123/590 |
| 2,996,290 | 8/1961 | Munden . | |
| 3,449,098 | 6/1969 | Larson, Sr. . | |
| 3,509,860 | 5/1970 | Ferriday | 123/593 |
| 3,620,195 | 11/1971 | Lemm . | |
| 3,861,376 | 1/1975 | Ashley | 123/590 |
| 3,934,569 | 1/1976 | Bobene | 48/189.6 |
| 4,088,103 | 5/1978 | Brown . | |
| 4,094,290 | 6/1978 | Dismuke . | |
| 4,114,580 | 9/1978 | Coats . | |
| 4,174,686 | 11/1979 | Shimizu et al. | 123/308 |
| 4,181,105 | 1/1980 | Takemoto et al. | 123/308 |
| 4,196,703 | 4/1980 | Okitsu et al. | 123/308 |
| 4,354,463 | 10/1982 | Otani et al. | 123/306 |
| 4,494,504 | 1/1985 | Yagi et al. | 1213/308 |
| 4,543,931 | 10/1985 | Hitomi et al. | 123/308 |
| 4,569,322 | 2/1986 | Gristina | 123/590 |
| 4,667,648 | 5/1987 | Beldin | 123/593 |
| 4,821,686 | 4/1989 | Baika et al. | 123/308 |
| 4,930,468 | 6/1990 | Stockhausen | 123/308 |
| 5,027,769 | 7/1991 | Yoshida et al. | 123/432 |

FOREIGN PATENT DOCUMENTS

| | | | |
|---|---|---|---|
| 2030806 | 12/1971 | Fed. Rep. of Germany | 123/593 |
| 0182924 | 7/1922 | United Kingdom | 48/189.6 |
| 0251287 | 10/1926 | United Kingdom | 123/593 |

*Primary Examiner*—E. Rollins Cross
*Assistant Examiner*—Erick Solis
*Attorney, Agent, or Firm*—Jerome R. Drouillard; Roger L. May

[57] ABSTRACT

An induction system for an internal combustion engine includes a turbulence-inducing structure, 18, extending across the flow path of a primary runner, 10. The turbulence-inducing structure, 18, is used in combination with a dual or single port intake design.

2 Claims, 3 Drawing Sheets

INDUCTION SYSTEM FOR AN INTERNAL COMBUSTION ENGINE

BACKGROUND OF THE INVENTION

1. Field of the Invention

This invention relates to an improved induction system for an internal combustion engine, and more particularly, to a fuel atomizing unit which can be used in conjunction with a single passage or divided passage induction system.

2. Disclosure Information

In a pre-mixed charge internal combustion engine which burns liquid fuel such as gasoline, it is necessary to generate a fuel-air mixture before combustion. This is accomplished by a fuel induction system comprising a carburetor or fuel injector. The ideal fuel-air mixture delivered to the intake manifold should be a homogeneous mixture of minute fuel particles in air to permit development of the maximum possible power. The mixture should have composition or strength to develop maximum economy for each condition of engine operation. When an engine is burning such an ideal fuel-air mixture, maximum combustion of the fuel is achieved while smoke and unburned fuel in the exhaust are held to a minimum.

The need for improving the fuel-air mixture in the combustion chamber has been recognized for many years. One solution for this problem has been to install screens at inlet ports of carbureted engines to improve the atomization of fuel. However, the use of these screens has adversely effected engine performance at wide open throttle operation due to partial blockage of fuel-air flow.

U.S. Pat. No. 4,114,580 discloses the use of a screen in the manifold of a carbureted engine.

According to the present invention, an induction system may be employed to significantly improve the quality of the fuel-air mixture without loss of wide open throttle power.

The dual port designs have not always produced the desired result of better combustion stability. This may be due to poor mixing and stratification in the cylinder and large scale turbulent flow patterns. This results in a long burn duration at idle or light load conditions, which produces unstable combustion. This invention uses a grid in combination with a dual port design to produce small scale turbulent eddy flow structures. These small scale flow structures promote mixing of the residual and incoming charge, resulting in increased burn speed and stabilized combustion. This invention does not compromise full power and torque capabilities, while retaining efficient idle characteristics. Therefore, dual port designs may now achieve intended performance goals.

SUMMARY OF THE INVENTION

A divided port induction system for an internal combustion engine comprises a primary runner having a throttle device contained therein, a turbulence-inducing grid fixed in the primary runner downstream from the throttle device, and a secondary runner having a throttle device contained therein.

DETAILED DESCRIPTION OF THE PREFERRED EMBODIMENTS

Figure 1:
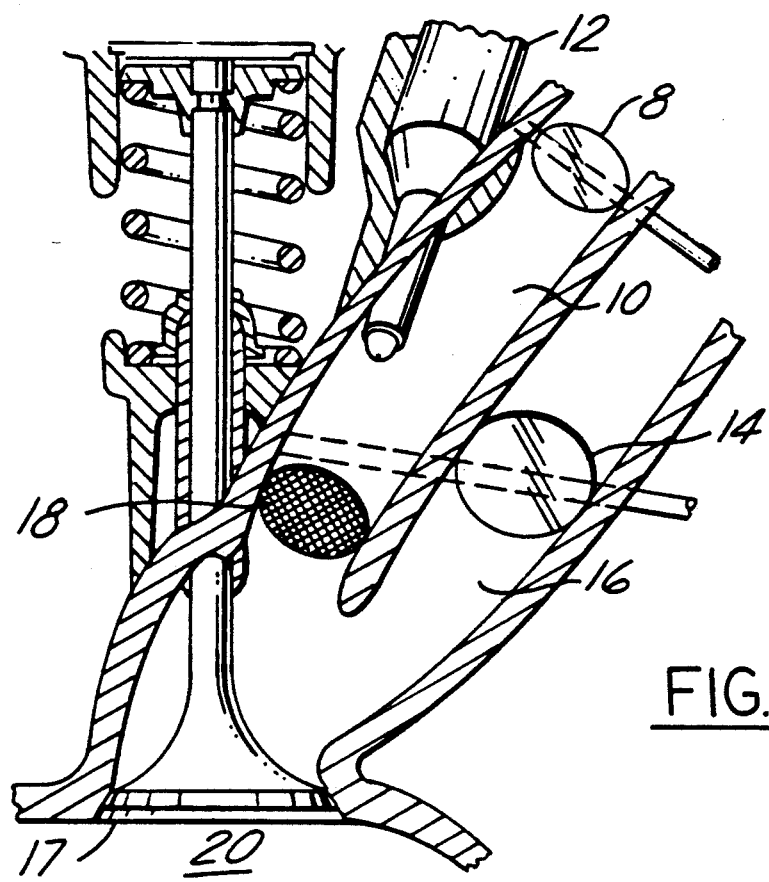
FIG. 1 is a vertical cross-section of a split port induction system according to the present invention in which a grid is mounted in place across a primary flow runner.

FIG. 1 shows a dual port induction system for an internal combustion engine. Fuel injector 12 sprays fuel into primary flow runner 10. This fuel mixes with the air flowing through the runner 10. The fuel-air mixture then passes through an inlet valve, 17, and into a combustion chamber, 20, where the mixture is ignited. As shown in FIG. 1, one embodiment of the present invention comprises installing a turbulence-generating grid, 18, across a primary flow runner 10 of the induction system.

In this embodiment, the inlet charge is free to flow through primary runner 10 under all engine operating conditions, subject to flow restriction by the primary throttle plate 8. Under high speed or "wide open throttle" conditions, a secondary throttle, 14, is open in order to allow maximum flow. Under low speed or idle conditions, secondary throttle plate 14 is closed. This causes increased flow velocity through grid 18, thus improving in-cylinder turbulence. This improves mixing of the trapped residual and incoming charge, and therefore increases burn speed, as well as stabilizing combustion.

Figure 2:
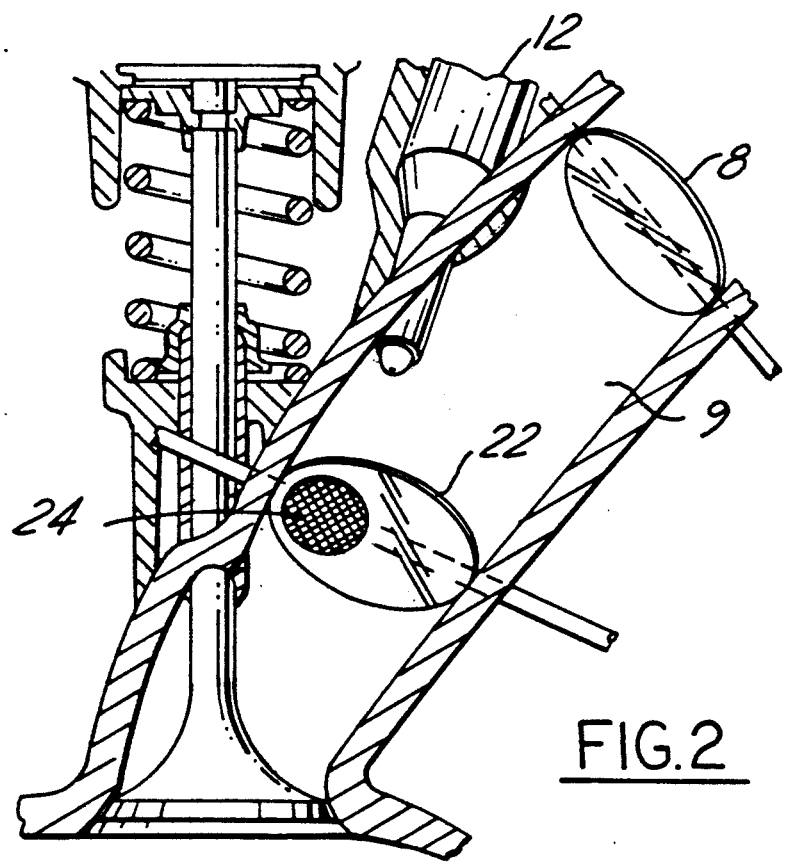
FIG. 2 is a vertical cross-section of a single passage induction system according to the present invention in which a grid is mounted on a throttle shaft in a primary flow runner.

A second embodiment of the present invention, shown in FIG. 2, comprises a turbulence-generating grid, 24, mounted in a throttle plate, 22, in a single inlet runner, single inlet valve induction system. Grid 24 is installed in a biased position across an opening in throttle plate 22. Grid 24 is located so as to enhance swirl and turbulence during idle and/or low speed conditions. This embodiment essentially accomplishes the same results as those seen with the first embodiment, but is applicable to engines with very restricted inlet manifolds where there is insufficient room to install a dual port system. Those skilled in the art will appreciate in view of this disclosure that the present embodiment may require the attachment of guide vanes either to the walls of the inlet port or to the throttle plate in order to guide the incoming charge flow in the most desirable direction to improve mixing and swirl.

Figure 3:
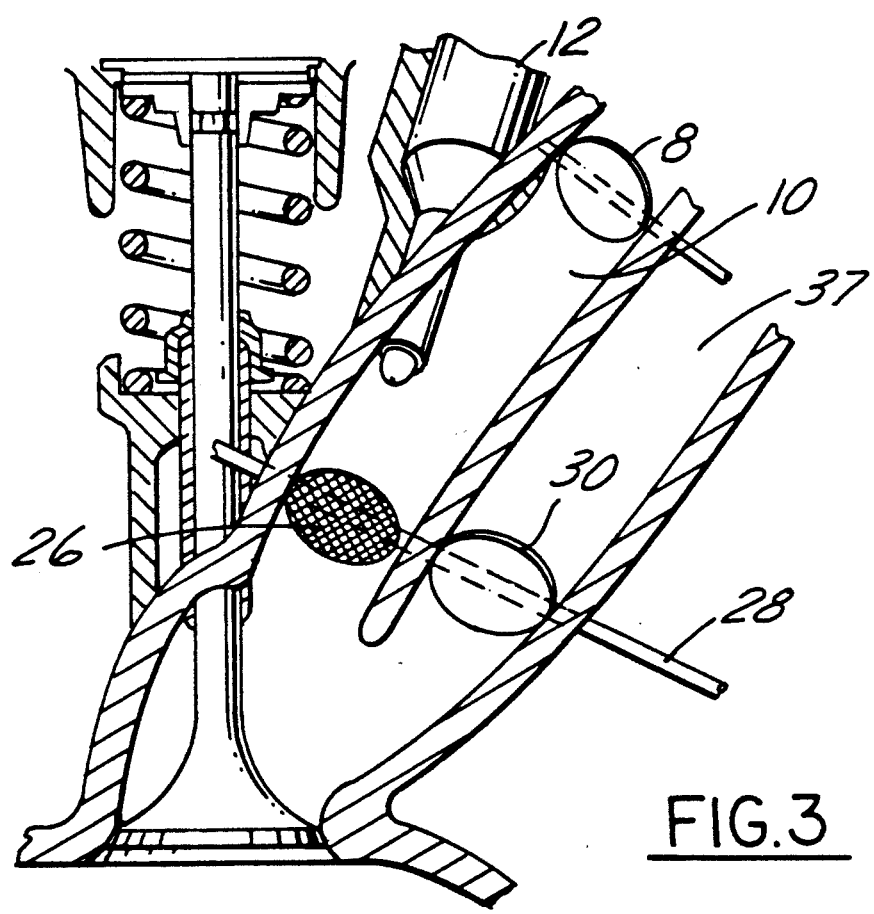
FIG. 3 is a vertical cross-section of a split port induction system according to the present invention in which a grid is mounted on a throttle shaft in a primary flow runner.

FIG. 3 shows a third embodiment involving a divided port induction system This embodiment comprises a grid, 26, extending across a primary runner, 10, and mounted to a throttle shaft, 28. Grid 26 is installed on the same throttle shaft 28 as is the secondary port throttle plate, 30. This allows grid 26 to be opened along with the secondary throttle plate 30 under high speed or heavy load conditions.

Figure 4:
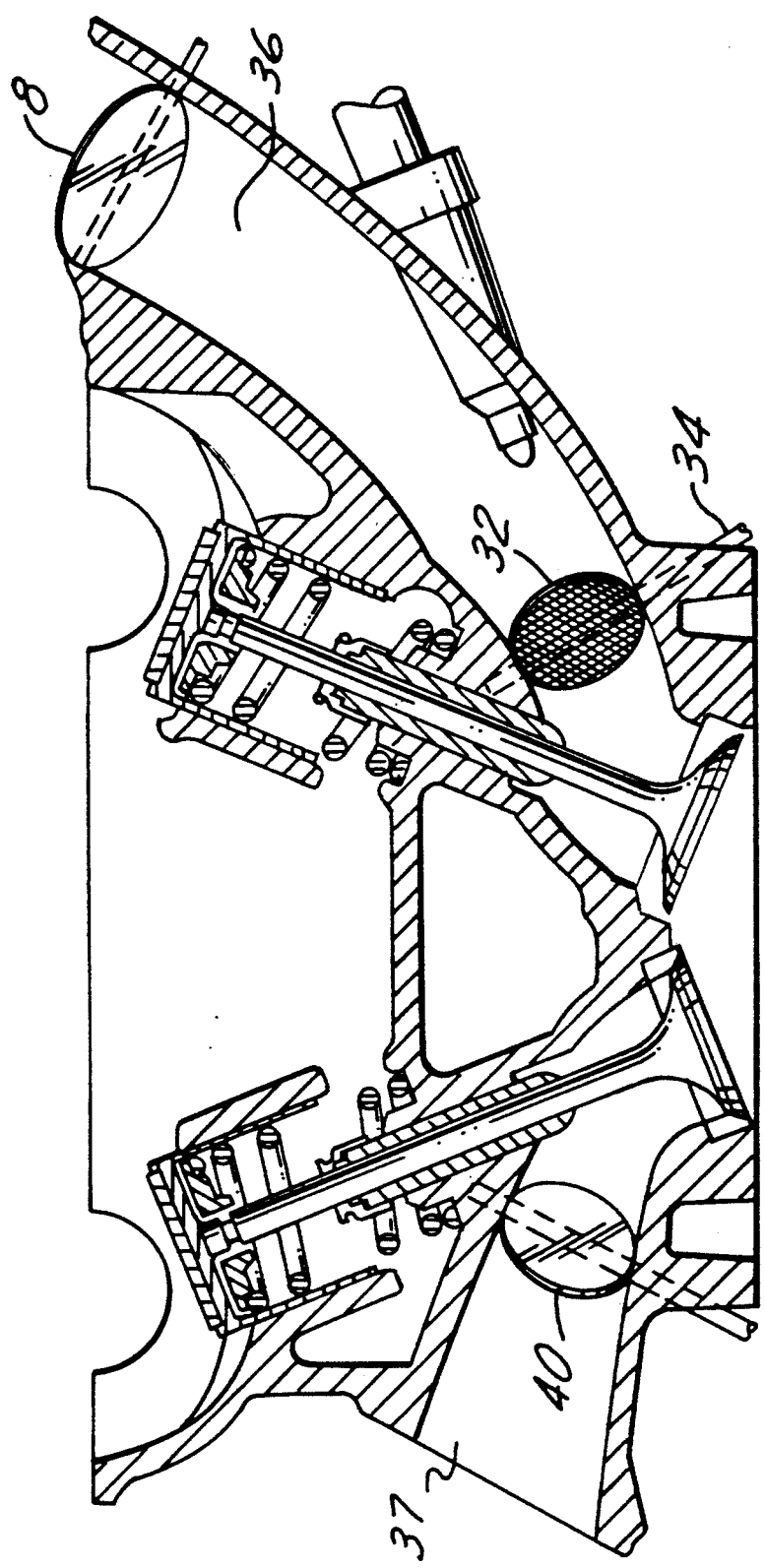
FIG. 4 is a vertical cross-section of a multiple-valve per cylinder induction system according to the present invention in which a grid is mounted on a throttle shaft in a primary flow runner.

FIG. 4 shows a fourth embodiment involving a divided port induction system for a multiple inlet valve engine. A primary flow runner, 36, and a secondary flow runner, 37, transport the fuel/air mixture into the combustion chamber, 20. This embodiment comprises a grid, 32, extending across primary runner 36 and mounted to a throttle shaft, 34. Alternatively, the grid could be installed in a fixed position in primary runner 36. For an engine whose primary mode of mixing the inlet charge is "tumble", both inlet ports could have rotational turbulence generating grids installed, the secondary being a mirror image of the primary.

Those skilled in the art will appreciate in view of this disclosure that the first, third and fourth embodiments may be employed using a single primary throttle device servicing all cylinders of the engine in lieu of a plurality of separate throttle devices located in the primary runners of a dual port system.

What is claimed is:

1. A single passage induction system for an internal combustion engine, comprising:

a flow passage;

a throttle plate contained in said flow passage; and a turbulence-inducing grid mounted across an opening in said throttle plate said opening having a diameter of approximately one-half the diameter of said flow passage and being located adjacent a fuel injector mounted in said flow passage.

2. A dual port induction system for an internal combustion engine, comprising:

a primary runner having a throttle device contained therein;

a turbulence-inducing grid extending across said primary runner and mounted to a throttle shaft; and a secondary runner having a throttle device contained therein, with said throttle device being mounted to said throttle shaft such that said turbulence-inducing grid and the throttle device of the secondary runner will open simultaneously.

* * * * *